(12) United States Patent
Hazel et al.

(10) Patent No.: US 7,374,825 B2
(45) Date of Patent: May 20, 2008

(54) PROTECTION OF THERMAL BARRIER COATING BY AN IMPERMEABLE BARRIER COATING

(75) Inventors: Brian Thomas Hazel, West Chester, OH (US); Irene Spitsberg, Loveland, OH (US); Christine Govern, Cincinnati, OH (US); Bangalore A. Nagaraj, West Chester, OH (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 11/001,983

(22) Filed: Dec. 1, 2004

(65) Prior Publication Data

US 2006/0115659 A1 Jun. 1, 2006

(51) Int. Cl.
*B32B 15/04* (2006.01)
*F03B 3/12* (2006.01)

(52) U.S. Cl. .............. 428/632; 428/701; 428/702; 428/469; 416/241 B (58) Field of Classification Search ........... 416/241 B, 416/241 R; 428/446, 443, 632, 701, 702, 428/469
See application file for complete search history.

(56) References Cited

U.S. PATENT DOCUMENTS

| | | | |
|---|---|---|---|
| 4,055,705 A | 10/1977 | Stecura et al. ............. 428/633 |
| 4,328,285 A | 5/1982 | Siemers et al. ............. 428/633 |
| 4,975,330 A | 12/1990 | Mosser ................... 428/472.1 |
| 5,192,497 A * | 3/1993 | Sato ........................ 420/581 |
| 5,216,808 A | 6/1993 | Martus et al. ............. 29/889.1 |
| 5,236,745 A | 8/1993 | Gupta et al. ............... 427/454 |
| 5,260,099 A | 11/1993 | Haskell .................... 427/367 |
| 5,660,885 A | 8/1997 | Hasz et al. .............. 427/374.5 |
| 5,773,141 A | 6/1998 | Hasz et al. ................ 428/335 |
| 5,851,678 A | 12/1998 | Hasz et al. ................ 428/469 |
| 5,871,820 A | 2/1999 | Hasz et al. .............. 427/419.2 |
| 5,914,189 A | 6/1999 | Hasz et al. ................ 428/335 |
| 6,544,351 B2 | 4/2003 | Wang et al. ................ 148/22 |
| 6,562,409 B2 | 5/2003 | Koshkarian et al. ..... 427/376.2 |
| 6,607,852 B2* | 8/2003 | Spitsberg et al. .......... 428/702 |
| 6,627,323 B2* | 9/2003 | Williams et al. ........... 428/702 |
| 6,733,908 B1 | 5/2004 | Lee et al. ................. 428/702 |
| 6,759,151 B1* | 7/2004 | Lee ......................... 428/702 |
| 2002/0098391 A1 | 7/2002 | Tanaka et al. ............. 428/697 |
| 2006/0099358 A1* | 5/2006 | Raybould et al. .......... 428/34.1 |
| 2006/0110609 A1* | 5/2006 | Eaton et al. .............. 428/446 |

OTHER PUBLICATIONS

Patent Abstracts of Japan, F. Takayuki, "Production of Multilayer Ceramic Material", vol. 2000, No. 12, Jan. 3, 2001, publication No. 2000 2647 46 A.

Yirong He et al., "Development of Refractory Silicate-YSZ Dual Layer TBCs", NASA/TM-1999-209079, Jul. 1999, XP002363430 retrieved from the Internet: URL:http://gltrs.grc.nasa.gov/reports/1999/TM-1999-209079.pdf, 19 pages.

* cited by examiner

*Primary Examiner*—Jennifer McNeil
(74) *Attorney, Agent, or Firm*—Harrington & Smith, PC (57) ABSTRACT

According to an embodiment of the invention, disclosed is a composite comprising a porous thermal barrier coating on a metallic part and an impermeable barrier coating adjacent to the outer surface of the thermal barrier coating. The impermeable barrier coating is dense and non-porous and comprises a rare earth silicate, the impermeable barrier coating thereby preventing infiltration of the contaminant composition into the thermal barrier coating.

23 Claims, 5 Drawing Sheets

PROTECTION OF THERMAL BARRIER COATING BY AN IMPERMEABLE BARRIER COATING

GOVERNMENT RIGHTS

The invention was made in part under contract number N00019-96-C-1076 awarded by the Government (Navy). Accordingly, the Government has certain rights in this invention.

CROSS-REFERENCE TO RELATED APPLICATION

The subject application shares certain attributes with U.S. Ser. No., entitled, Protection of Thermal Barrier Coating By A Sacrificial Coating, which is filed concurrently herewith. The contents of this application are hereby incorporated by reference.

FIELD OF THE INVENTION

The invention generally relates to a method for protecting thermal barrier coatings deposited on gas turbine and other heat engine parts from the deleterious effects of environmental contaminants. More particularly, the invention relates to a method of using an impermeable coating, where the impermeable coating reduces infiltration of liquid contaminant compositions into the thermal barrier coating, as well as articles coated with the impermeable coating.

BACKGROUND OF THE INVENTION

Higher operating temperatures for gas turbine engines are continuously sought in order to increase efficiency. However, as operating temperatures increase, the high temperature durability of the components within the engine must correspondingly increase.

Significant advances in high temperature capabilities have been achieved through the formulation of nickel- and cobalt-based superalloys. For example, some gas turbine engine components may be made of high strength directionally solidified or single crystal nickel-based superalloys. These components are cast with specific external features to do useful work with the core engine flow and often contain internal cooling details and through-holes to provide external film cooling to reduce airfoil temperatures.

When exposed to the demanding conditions of gas turbine engine operation, particularly in the turbine section, the base alloy alone may be susceptible to damage, such as oxidation and corrosion attack, and may not retain adequate mechanical properties. Accordingly, the base alloys are often protected with various types of coating systems depending upon the engine part and operating environment.

Thermal barrier coatings are a key element in current and future gas turbine engine designs expected to operate at high temperatures, which produce high thermal barrier coating surface temperatures. One desired system for a hot high temperature engine part includes a strain-tolerant thermal barrier ceramic layer deposited onto a bond coating, which exhibits good oxidation/corrosion resistance.

Under service conditions, thermal barrier coated engine parts can also be susceptible to various modes of damage, including erosion, oxidation, and attack from environmental contaminants. At temperatures of engine operation, adherence of these environmental contaminants on the hot thermal barrier coated surface can cause damage to the thermal barrier coating. Environmental contaminants may form certain compositions, which are liquid at the surface temperatures of thermal barrier coatings.

Chemical and mechanical interactions occur between the contaminant compositions and the thermal barrier coatings. Molten contaminant compositions can dissolve the thermal barrier coating or can infiltrate its pores and openings, initiating and propagating cracks causing delamination and loss of thermal barrier coating material.

Some environmental contaminant compositions that deposit on thermal barrier coating surfaces contain oxides mainly of calcium, magnesium, aluminum, silicon, and mixtures thereof with possible minor oxide additions of titanium, iron, nickel, chromium and mixtures thereof. These oxides combine to form contaminant compositions comprising calcium-magnesium-aluminum-silicon-oxide systems ($CaO$—$MgO$—$Al_2O_3$—$SiO_2$), herein referred to as CMAS. Damage to thermal barrier coatings occurs when the molten CMAS infiltrates the thermal barrier coating. After infiltration and upon cooling, the molten CMAS, or other molten contaminant composition, solidifies. The stress build up in the thermal barrier coating may cause cracking and/or spallation of the coating material and loss of the thermal protection that it provides to the underlying part. Alternately or in addition, the CMAS can react chemically with the TBC to accelerate thermal sintering or dissolve stabilizing components such as $Y_2O_3$ resulting in damage to the TBC coating.

U.S. Pat. No. 5,660,885 discloses sacrificial oxide protective coatings to be applied over a thermal barrier coating. In particular, this patent discloses sacrificial oxide protective coatings of alumina, magnesia, chromia, calcia, scandia, calcium zirconate, silica, spinels such as magnesium aluminum oxide, and mixtures thereof. U.S. Pat. Nos. 5,851,678, 5,871,820, 5,914,189 and 6,627,323 disclose various methods for covering a thermal barrier coating with barrier materials. In particular, these patents disclose impermeable barrier coatings of metal oxides, metal carbides, metal nitrides, metal suicides, precious metals, platinum group metals and mixtures thereof, which inhibits liquid contaminant compositions from infiltrating into or reacting with the thermal barrier coating at the operating temperature of the thermal barrier coating.

Despite the above advances, there is an ongoing need to reduce or prevent the damage to the thermal barrier coatings caused by the reaction or infiltration of molten contaminant compositions at the operating temperature of the engine. Embodiments of the invention fulfill this need and others.

BRIEF DESCRIPTION OF THE INVENTION

In accordance with embodiments of the invention, we have advantageously determined that the use of rare earth silicates will advantageously prevent CMAS from coming in contact with the thermal barrier coating. The CMAS will not infiltrate and build up stress in or chemically react with the thermal barrier coating and the thermal barrier coating will advantageously remain intact.

Accordingly, in one embodiment of the invention, a composite is disclosed. The composite comprises a porous thermal barrier coating on a metallic part and an impermeable barrier coating adjacent to the outer surface of the thermal barrier coating. The impermeable barrier coating is dense and non-porous and comprises a rare earth silicate. The impermeable barrier coating advantageously prevents infiltration of the contaminant composition into or reaction with the thermal barrier coating.

In accordance with another embodiment of the invention, a composite is disclosed. The composite comprises a thermal barrier coating on a gas turbine engine metallic part, which has a contaminant composition present that adheres to an outer surface of the thermal barrier coated part. The thermal barrier coating comprises a ceramic material admixed or graded with a rare earth silicate, to prevent infiltration of the contaminant composition into the thermal barrier coating.

In accordance with a further embodiment of the invention, a method for protecting a thermal barrier coating on a superalloy part is disclosed. The method comprises depositing a dense, non-porous, impermeable barrier coating comprising a rare earth silicate on the thermal barrier coating, which is located on the superalloy part, thereby preventing infiltration of the contaminant composition into the thermal barrier coating. This embodiment of the invention can be used in conjunction with the previously mentioned U.S. Pat. No. 5,660,885 sacrificial coating. The barrier layer may be adjacent to the thermal barrier coating with the sacrificial coating overlaying the barrier coating and adjacent to the outer surface or vise versa.

Other features and advantages will be apparent from the following more detailed description and drawings, which illustrates by way of example the principles of the invention.

DETAILED DESCRIPTION OF THE INVENTION

In accordance with embodiments of the invention, degradation of thermal barrier coatings by environmental contaminants that form molten contaminant compositions may be prevented by application of a rare earth silicate over the thermal barrier coating or graded/admixed therewith. Accordingly, infiltration or viscous flow of the contaminant composition into the thermal barrier coating may be prevented. Composites formed in accordance with embodiments of the invention also protect the thermal barrier coating from dissolution or spallation due to mechanical or chemical attack by the contaminant composition. The liquid contaminant composition is unable to penetrate the impermeable coating, and thus is unable to attack the thermal barrier coating. The barrier coating thus formed enhances the life of the thermal barrier coating part and reduces thermal barrier coated part failure.

Sources of environmental contaminants include, but are not limited to, sand, dirt, volcanic ash, fly ash, cement, runway dust, substrate impurities, fuel and air sources, oxidation products from engine components, and the like. The environmental contaminants adhere to the surfaces of the thermal barrier coated part. At the operating temperatures of the thermal barrier coating, the environmental contaminants then form contaminant compositions on the surfaces of the thermal barrier coating, which may have melting ranges or temperatures at or below the operating temperature. The term "operating temperature" used herein means the surface temperature of the thermal barrier coating during its operating in a given application, such as a gas turbine engine.

The environmental contaminants may also include magnesium, calcium, aluminum, silicon, chromium, iron, nickel, barium, titanium, alkali metals, and compounds thereof, to name a few. The environmental contaminants may be oxides, carbonates, salts and mixtures thereof.

The chemical composition of the contaminant composition typically corresponds to the composition of the environmental contaminants from which it is formed. For example, at operating temperatures of about 1000° C. (1832° F.) or higher, the contaminant composition generally corresponds to compositions of calcium-magnesium-aluminum-silicon oxide systems or CMAS. Generally, the environmental contaminant compositions known as CMAS comprise primarily a mixture of magnesium oxide (MgO), calcium oxide (CaO), aluminum oxide ($Al_2O_3$) and silicon oxide ($SiO_2$). Other elements, such as nickel, iron, titanium and chromium may be present in the CMAS in minor amounts when these elements or their compounds are present in the environmental contaminants. A minor amount is an amount less than about ten weight percent of the total amount of the contaminant composition present. For example, the contaminant composition may take the form of 29 wt % calcium oxide, 7 wt % magnesium oxide, 11 wt % aluminum oxide, 43 wt % silicon oxide, 2 wt % nickel oxide, 8 wt % iron oxide, and small amounts of titanium oxide and chromium oxide may be present up to about 10 wt % each which corresponds to a melting point of about 1227° C. (2240° F.).

The protective coating of the composites of the invention may be described as impermeable or impervious in that it prevents the liquid contaminant composition from contacting the thermal barrier coating so that chemical or physical changes of the thermal barrier coating do not occur due to infiltration or reaction with the contaminant composition. The character of the protective coating is dense, to the point where porosity is not interconnected forming a free path from one surface of the protective coating to the other, and non-penetratable. The impermeable barrier coating is thus dense and non-porous to the point where interconnected porosity allowing free paths from one side to the other is avoided. The result is that infiltration of the contaminant composition, e.g., liquid CMAS, into or chemical reaction with the thermal barrier coating at operating temperatures of engines is eliminated or decreased. Thus, the CMAS will not infiltrate and build-up stress in or chemically react with the thermal barrier coating and the thermal barrier coating will advantageously remain intact, in accordance with embodiments of the invention.

Such an impermeable or impervious coating may comprise a rare earth silicate deposited on the outer surface of a thermal barrier coating, in accordance with an embodiment of the invention shown in FIG. 1, and as described in further detail below. The impermeable coating acts as a barrier between the thermal barrier coating and a liquid contaminant mixture.

Figure 1:
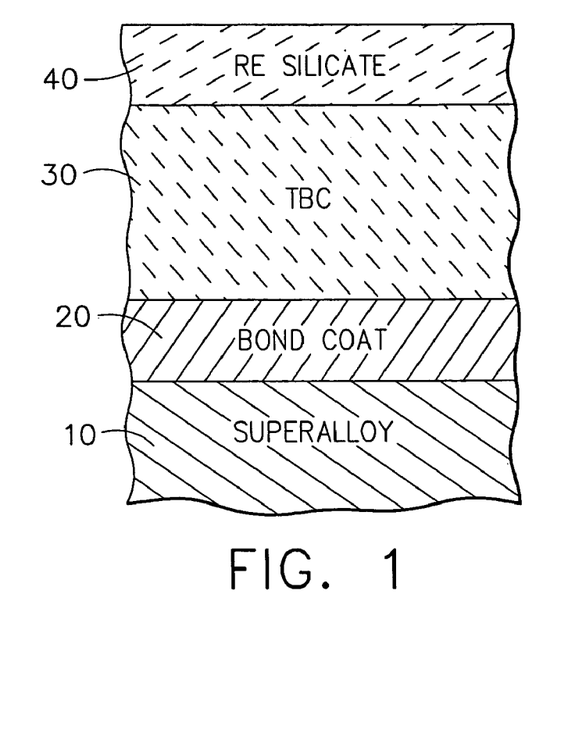
FIG. 1 is a schematic illustration of a composite, in accordance with an embodiment of the invention.

As shown in FIG. 1, the base metal substrate 10 may be made of any suitable material including, but not limited to, a superalloy of Ni, Co, Fe, or combinations thereof. For many gas turbine engine applications, such as turbine blades, vanes, shrouds and other components, the base metal substrate 10 is a directionally solidified or single crystal Ni-based superalloy.

At least one bond coat 20 may then be optionally, conventionally deposited on the base metal substrate 10. Suitable bond coats 20 include, but are not limited to, conventional diffusion coatings, such as nickel and platinum aluminides, MCrAlY coatings, etc. Aluminum-rich bond coats are known to develop an aluminum oxide (alumina) scale, which is grown by oxidation of the bond coat 20. The alumina scale chemically bonds a TBC to the bond coat 20 and substrate 10. The thickness of bond coat 20 may be of any suitable thickness for its intended application, as one skilled in the art would recognize.

As further shown in FIG. 1, a thermal barrier coating (TBC) 30 may be deposited over one or more bond coat 20. Alternatively, thermal barrier coating 30 may be deposited directly onto the base metal substrate 10. Thermal barrier coating 30 may comprise any suitable ceramic material alone or in combination with other materials. For example, thermal barrier coating 30 may comprise fully or partially stabilized ytrria-stabilized zirconia and the like, as well as other low conductivity oxide coating materials known in the art. Examples of other suitable ceramics include, but are not limited to, about 92-93 weight percent zirconia stabilized with about 7-8 weight percent yttria, among other known ceramic thermal barrier coatings, such as nonstabilized zirconia, zirconia partially or fully stabilized by one or more of calcia, magnesia, ceria, scandia, yttria, rare earth oxides or other oxides. The thermal barrier coating 30 may also comprise hafnia, zirconia or a mixture of hafnia and zirconia stabilized by one or more of yttria, scandia, magnesia, calcia, ceria and lanthanide series oxides.

The thermal barrier coating 30 may be applied by any suitable methods. One suitable method for deposition is by electron beam physical vapor deposition (EB-PVD), although plasma spray deposition processes, such as air plasma spray (APS), also may be employed for, e.g., combustor application. The density of a suitable EB-PVD applied ceramic thermal barrier coating 30 may be about 4.7 g/cm$^3$, among other suitable densities, and more particular examples of ceramic thermal barrier coatings are described in U.S. Pat. Nos. 4,055,705, 4,328,285, 5,216,808 and 5,236,745 to name a few. The thermal barrier coating 30 may be applied to any desired thickness. For example, the coating 30 may have a thickness between about 75 micrometers and about 300 micrometers. The thickness may vary from location to location on a given part to, for example, provide the optimal level of cooling and balance of thermal stresses.

In the embodiment shown in FIG. 1, an impermeable barrier coating 40 comprises a rare earth silicate. Suitable rare earth silicates include, but are not limited to, silicates of lanthanum, praseodymium, neodymium, promethium, samarium, europium, gadolinium, terbium, dysprosium, holmium, erbium, thulium, ytterbium, lutetium, scandium, yttrium and mixtures thereof. The rare earth silicate may be in the form of a monosilicate, $M_2SiO_5$, a disilicate, $M_2Si_2O_7$, or in combinations thereof. In addition, the monosilicate, disilicate or combinations may be deposited in combination with the rare earth oxide, $M_2O_3$.

The thickness of the impermeable barrier coating 40 may be determined by such considerations as: the application and design of the thermal barrier coated part, the amount and composition of the contaminant composition that is encountered during service, the operating temperature of the thermal barrier coating 30, coefficient of thermal expansion differential between the impermeable barrier and the thermal barrier coating and the locality and geographic limitations where the thermal barrier coating part will be used. An effective amount of impermeable barrier coating 40 is an amount needed to inhibit the contaminant composition from penetrating an opening in the thermal barrier coating 30. The thickness of the impermeable barrier coating 40 may thus be of any suitable thickness and typically may vary from about 0.2 micrometers to about 250 micrometers, more typically between about 1-125 micrometers.

In selecting the particular composition of the impermeable barrier coating 40, the surface temperature of the thermal barrier coating 30 during its operation should be considered, as well as the type and composition of the environmental contaminants that will be encountered. It is contemplated that the impermeable barrier coating 40 will have a melting temperature above the operating temperature of the thermal barrier coating 30.

The impermeable barrier coating 40 may be deposited on the thermal barrier coating 30 by any suitable method including, but not limited to, sol-gel, sputtering, air plasma spray, organo-metallic chemical vapor deposition, physical vapor deposition, chemical vapor deposition, hot pressing, and the like. The choice of the coating method depends, in part, on where and how the thermal barrier coated part will be used and the desired thickness for such use. In selecting a method of deposition, the desired thickness of the coating 40 should be considered and the coating should be as pore-free and crack free as possible since these will lead to free paths for contaminant composition with the thermal barrier coating.

Figure 2:
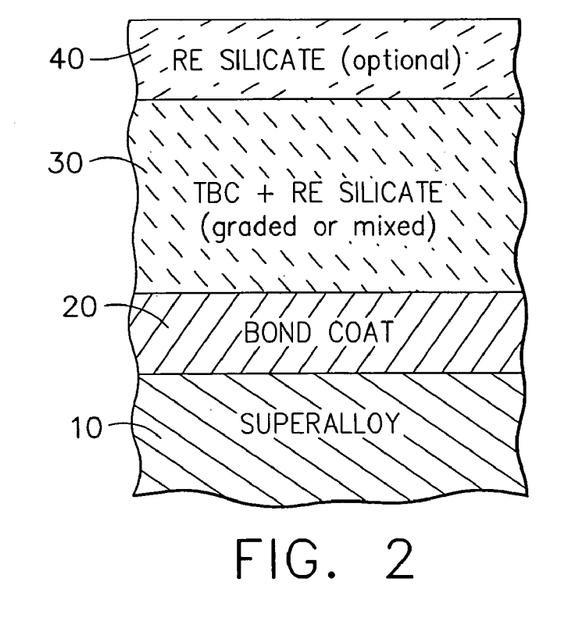
FIG. 2 is a schematic illustration of a composite including a graded or mixed thermal barrier coating layer, in accordance with an embodiment of the invention.

In accordance with another embodiment of the invention schematically shown in FIG. 2, the afore-described thermal barrier coating 30 may comprise a ceramic thermal barrier coating, as described above, which is graded or mixed with a rare earth silicate, as also described above. In this embodiment, a graded layer containing a mixture of rare earth silicate and yttria stabilized zirconia is present between the top layer of rare earth silicate and the underlying yttria stabilized zirconia. The graded layer can be typically 2 to 10 mils thick, and more typically 5 to 8 mils. The graded layer can have a single mixed composition of zirconia and rare earth silicate or can consist of gradual grading from 90% zirconia+10% rare earth silicate near the zirconia layer changing gradually to 90% rare earth silicate+10% zirconia immediately under the top layer of rare earth silicate. The impermeable barrier coating 40 may then be optional applied over the graded or mixed layer.

Figure 3:
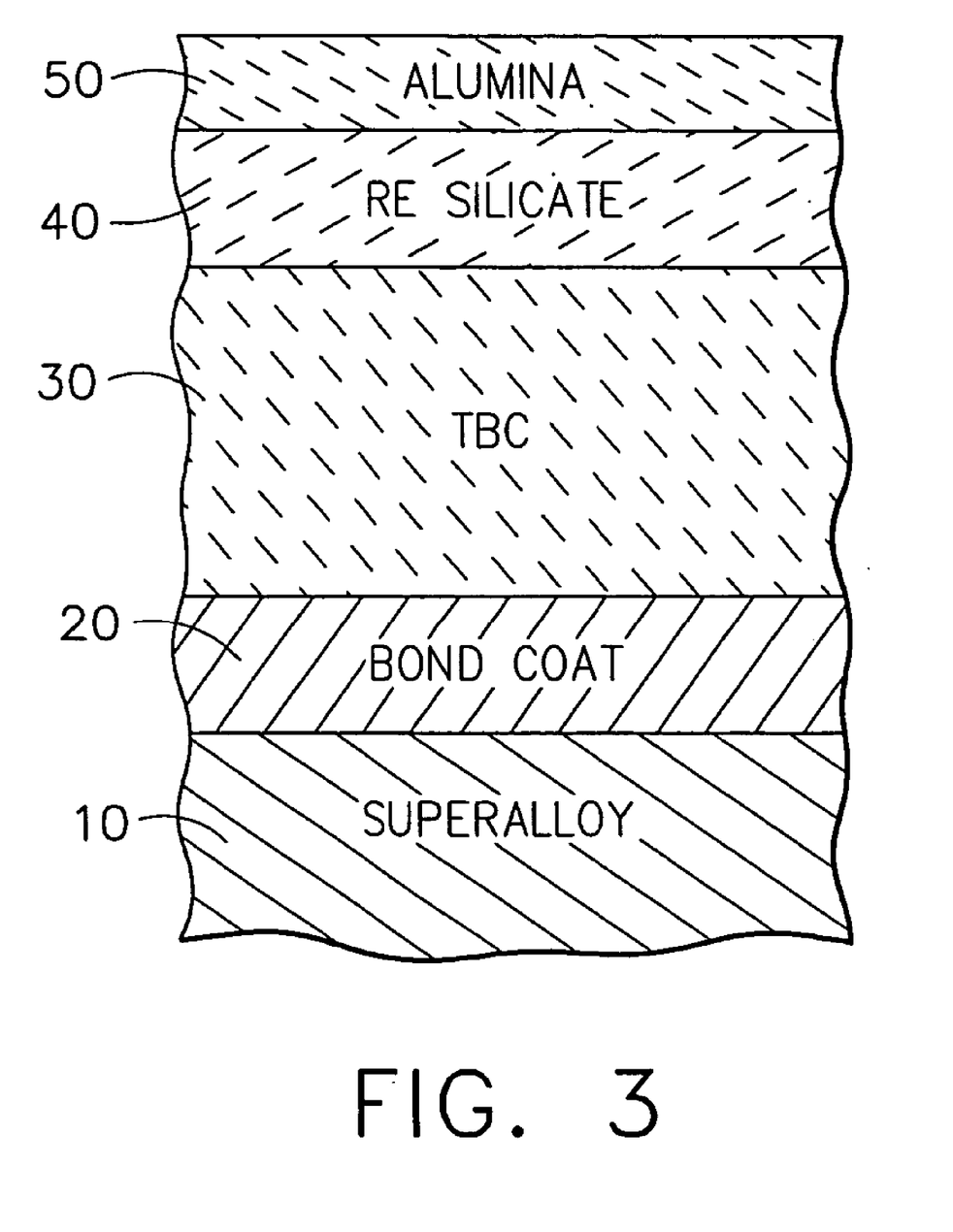
FIG. 3 is a schematic illustration of a composite including an outer layer of alumina, in accordance with an embodiment of the invention.

In accordance with a further embodiment of the invention, shown schematically in FIG. 3, the embodiment set forth in FIG. 1 may be further modified with the addition of a layer of alumina 50 over the impermeable barrier coating 40. This alumina layer 50 has a dense microstructure as a result of being deposited by methods, such as PVD, CVD or other suitable techniques known in the art. The function of this layer is to serve as a sacrificial layer, reacting with molten CMAS that tries to infiltrate the TBC to form one or more refractory phases with higher melting temperatures than CMAS as described in U.S. Pat. No. 5,660,885. The alumina content of the CMAS may thus be increased to the eutectic point, yielding a modified CMAS with a melting and/or crystallization temperature equal to the surface temperature of the thermal barrier coating or the impermeable barrier. As a result, the reaction product of the alumina layer 50 and the CMAS may resolidify before infiltrating any of the other layers. A suitable thickness for the alumina layer 50 may be between about 0.1 and about 75 micrometers, and more typically between about 3 and about 25 micrometers.

Similarly, the layer of alumina 50 may alternatively or additionally be located under the impermeable barrier coating 40, typically adjacent the TBC 30. If such a layer is located under the impermeable barrier coating 40, a suitable thickness may typically be about 1 to about 75 micrometers, more typically about 3 to about 25 micrometers.

In alternative embodiments of the invention, any suitable sacrificial layer may be employed for layer 50. Examples of sacrificial layers include those disclosed in U.S. Pat. Nos. 5,660,885, 5,773,141 and 5,914,189. Other suitable sacrificial coatings include the phosphate coatings disclosed in the afore-referenced commonly assigned U.S. serial no., which is entitled Protection of Thermal Barrier Coating By a Sacrificial Coating.

EXAMPLE

Embodiment of the invention will be described by way of example, which is meant to be merely illustrative and therefore non-limiting.

Example

Figure 4:
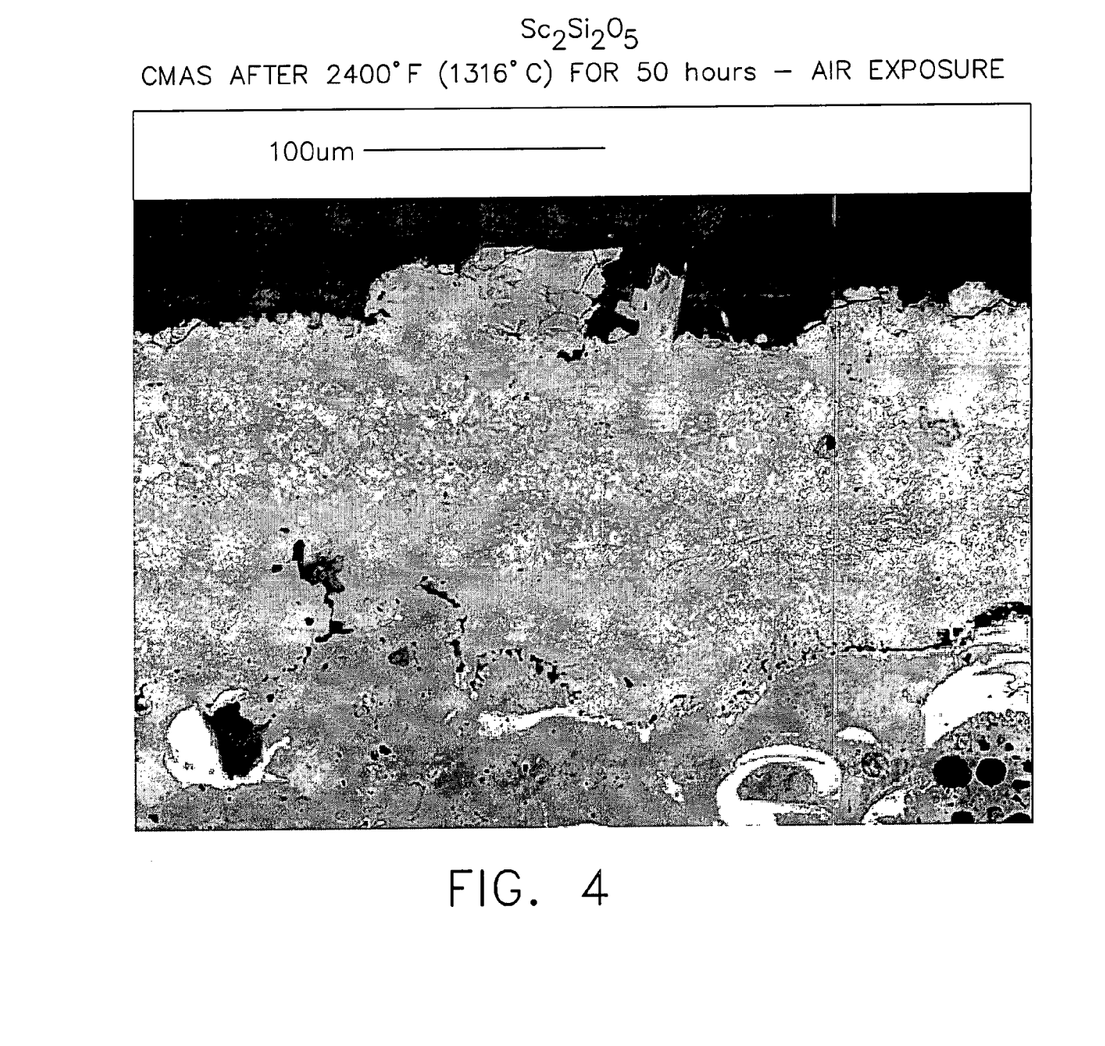
FIG. 4 shows thermal exposure testing results of $Sc_2SiO_5$ with ~80 mg/in$^2$ CMAS after about 50 hours at about 1315° F. (2400° C.), in accordance with an embodiment of the invention.

To evaluate the potential for using an impermeable barrier coating, $Sc_2SiO_5$ material was hot pressed and sintered into a free standing ceramic pellet. The $Sc_2SiO_5$ was tested in thermal exposure at about 1315° F. (2400° C.) (FIG. 4) for about 50 hours with ~80 mg/in² CMAS overlaying the surface.

Figure 5:
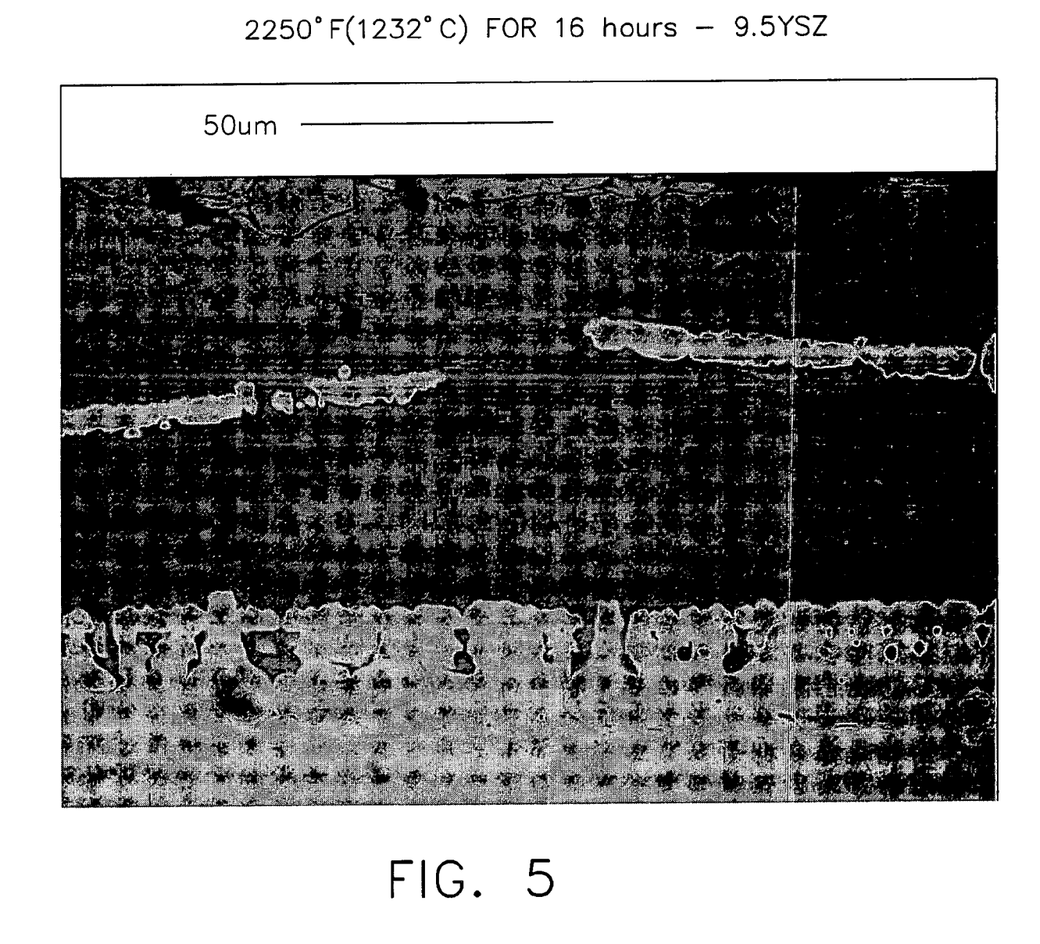
FIG. 5 shows thermal exposure testing results of 9.5 wt % yttria stabilized zirconia with ~80 mg/in$^2$ CMAS after about 16 hours at about 1232° F. (2250° C.), in accordance with an embodiment of the invention.
Figure 6:
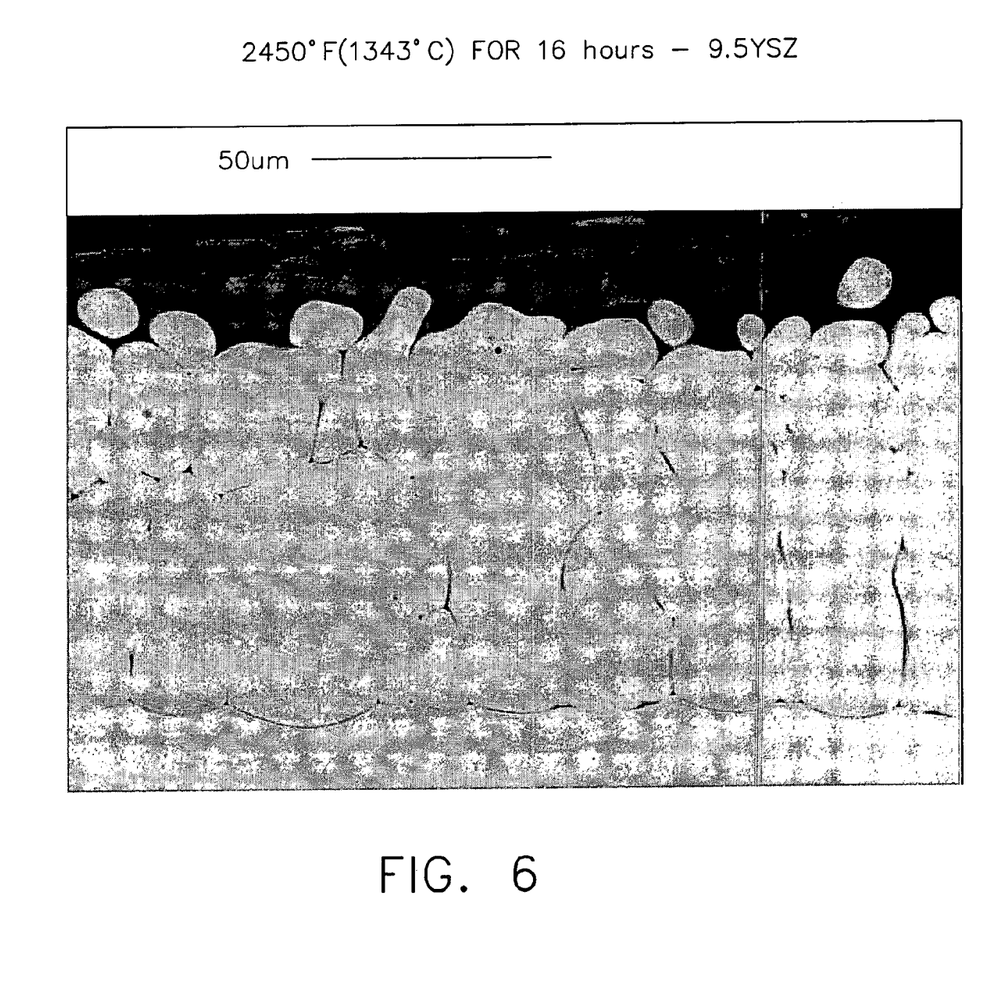
FIG. 6 shows thermal exposure testing results of 9.5 wt % yttria stabilized zirconia with ~80 mg/in$^2$ CMAS after about 16 hours at about 1343° F. (2450° C.).

This $Sc_2SiO_5$ material was then compared with free standing 9.5 wt % yttria stabilized zirconia (YSZ) samples. Shown in FIG. 5 and FIG. 6 are the thermal exposure attack of the YSZ samples at about 1232° F. (2250° C.) for about 16 hours with ~80 mg/in² CMAS overlaying the surface and 1343° C. (2450° F.) for about 16 hours with ~80 mg/in² CMAS overlaying the surface. As can be seen from a comparison of the figures, this example advantageously demonstrates the lack of material loss for the $Sc_2SiO_5$ sample demonstrating the strong resistance to environmental attack as compared with YSZ.

While various embodiments are described herein it will be appreciated from the specification that various combinations of elements, variations or improvements therein may be made by those skilled in the art, and are within the scope of the invention.

What is claimed is:

1. A composite comprising a porous thermal barrier coating comprising stabilized zirconia on a metallic part selected from the group consisting of a Ni based and a Co based superalloy, and an impermeable barrier coating adjacent to the outer surface of the thermal barrier coating and forming an outer layer of the composite, wherein the impermeable barrier coating is dense and non-porous and comprises a rare earth silicate selected from the group consisting of a silicate of lanthanum, praseodymium, neodymium, promethium, samarium, europium, gadolinium, terbium, dysprosium, holmium, erbium, thulium, ytterbium, lutetium, scandium, yttrium and mixtures thereof, the impermeable barrier coating thereby preventing infiltration of a contaminant composition into the thermal barrier coating.

2. The composite of claim 1, comprising a contaminant composition present that adheres on an outer surface of the coated part.

3. The composite of claim 1, wherein the thermal barrier coating comprises yttria-stabilized zirconia.

4. The composite of claim 1, wherein the thermal barrier coating comprises a mixture of hafnia and zirconia stabilized by one or more of yttria, scandia, magnesia, calcia, ceria and lanthanide series oxides.

5. The composite of claim 1, comprising an outer layer of a sacrificial coating over the impermeable barrier coating.

6. The composite of claim 5, comprising an alumina sacrificial coating over the impermeable barrier coating.

7. The composite of claim 1, comprising an inner layer of a sacrificial coating under the impermeable barrier coating.

8. The composite of claim 1, comprising a bond coat located under the thermal barrier coating.

9. The composite of claim 1, wherein the part is a gas turbine engine component.

10. The composite of claim 1, wherein the impermeable barrier coating has a thickness between about 0.2 to about 250 micrometers.

11. The composite of claim 10, wherein the thickness is between about 1 to about 125 micrometers.

12. The composite of claim 1 comprising the thermal barrier coating on a gas turbine engine metallic part, which has a contaminant composition present that adheres on an outer surface of the coated part.

13. The composite of claim 12, comprising the outer impermeable barrier coating over the thermal barrier coating, the impermeable barrier coating comprising $Sc_2SiO_5$.

14. The composite of claim 12, further comprising a bond coat located under the thermal barrier coating.

15. The composite of claim 14, wherein the thermal barrier coating comprises yttria-stabilized zirconia.

16. The composite of claim 13, wherein the thermal barrier coating comprises hafnia, zirconia or a mixture of hafnia and zirconia stabilized by one or more of yttria, scandia, magnesia, calcia, ceria and lanthanide series oxides.

17. The composite of claim 13, wherein the impermeable barrier coating has a thickness between about 0.2 to about 250 micrometers.

18. The composite of claim 17, wherein the thickness is between about 1 to about 125 micrometers.

19. The composite of claim 18, comprising an outer layer of a sacrificial coating over the impermeable barrier coating.

20. The composite of claim 19, comprising an alumina sacrificial coating over the impermeable barrier coating.

21. The composite of claim 1, wherein the substrate is a turbine blade.

22. A composite comprising a porous thermal barrier coating comprising stabilized zirconia on a metallic superalloy gas turbine engine part and an impermeable barrier coating adjacent to the outer surface of the thermal barrier coating and forming an outer layer of the composite, wherein the impermeable barrier coating is dense and non-porous and comprises a rare earth silicate selected from the group consisting of a silicate of lanthanum, praseodymium, neodymium, promethium, samarium, europium, gadolinium, terbium, dysprosium, holmium, erbium, thulium, ytterbium, lutetium, scandium, yttrium and mixtures thereof, the impermeable barrier coating thereby preventing infiltration of a contaminant composition into the thermal barrier coating, the composite comprising an inner layer of an alumina sacrificial coating under the impermeable barrier coating.

23. A composite comprising a porous thermal barrier coating comprising zirconia on a metallic superalloy part and an impermeable barrier coating adjacent to the outer surface of the thermal barrier coating and forming an outer layer of the composite, wherein the impermeable barrier coating is dense and non-porous and comprises a rare earth silicate selected from the group consisting of a silicate of lanthanum, praseodymium, neodymium, promethium, samarium, europium, gadolinium, terbium, dysprosium, holmium, erbium, thulium, ytterbium, lutetium, scandium, yttrium and mixtures thereof, the impermeable barrier coating thereby preventing infiltration of a contaminant composition into the thermal barrier coating, wherein the composite comprises an inner layer of a sacrificial coating of alumina under the impermeable barrier coating.

* * * * *